(12) United States Patent
Kim et al.

(10) Patent No.: US 10,044,240 B2
(45) Date of Patent: Aug. 7, 2018

(54) THREE PHASE MOTOR IN WHICH STRUCTURE FOR PREVENTING ELECTRICAL SHORT CIRCUIT IS APPLIED

(71) Applicant: MANDO CORPORATION, Pyeongtaek-si, Gyeonggi-do (KR)

(72) Inventors: Taesik Kim, Midland, MI (US); Mazharul Chowdhury, Midland, MI (US); Mohammad Islam, Saginaw, MI (US); Scott Blehm, Saginaw, MI (US)

(73) Assignee: MANDO CORPORATION, Pyeongtaek-si, Gyeonggi-do (KR)

( * ) Notice: Subject to any disclaimer, the term of this patent is extended or adjusted under 35 U.S.C. 154(b) by 343 days.

(21) Appl. No.: 14/858,060

(22) Filed: Sep. 18, 2015

(65) Prior Publication Data
US 2017/0085146 A1  Mar. 23, 2017

(51) Int. Cl.
*H02K 3/34* (2006.01)
*H02K 3/32* (2006.01)

(52) U.S. Cl.
CPC .............. *H02K 3/34* (2013.01); *H02K 3/325* (2013.01)

(58) Field of Classification Search
CPC ................................. H02K 3/325; H02K 3/34
USPC .................. 310/192, 198, 215, 195
See application file for complete search history.

(56) References Cited

U.S. PATENT DOCUMENTS

| 3,334,255 | A  | * | 8/1967 | Peters .................... | H02K 3/345 |
|---|---|---|---|---|---|
|  |  |  |  |  | 310/214 |
| 9,624,939 | B2 | * | 4/2017 | Sun .......................... | H02K 3/34 |
| 9,755,471 | B2 | * | 9/2017 | Katsuragi .............. | H02K 3/345 |
| 9,774,224 | B2 | * | 9/2017 | Kim ........................ | H02K 3/34 |

FOREIGN PATENT DOCUMENTS

| DE | 102011089674 A1 | * | 6/2013 | ............. H02K 3/325 |
|---|---|---|---|---|
| KR | 20150027714 A | * | 3/2015 | ............. H02K 3/325 |
| WO | WO 03098777 A1 | * | 11/2003 | ............. H02K 1/148 |
| WO | WO 2010113663 A1 | * | 10/2010 | ............. F04B 35/04 |

\* cited by examiner

*Primary Examiner* — Forrest M Phillips
(74) *Attorney, Agent, or Firm* — Hauptman Ham, LLP

(57) ABSTRACT

According to an embodiment of the present invention, a three phase motor in which a structure for preventing an electrical short circuit is applied includes a stator including a base portion having a hollow formed therein and a plurality of winding portions extending from the base portion toward the hollow and formed apart a predetermined distance from each other; a rotor having a plurality of magnets inserted therein and disposed in the hollow apart from ends of the winding portions; and an insulation sheet disposed between the winding portions abutting each other to prevent an electrical short circuit among the coils wound around the winding portions abutting each other.

4 Claims, 5 Drawing Sheets

< Upper >

< Lower >

< Upper >

< Lower >

THREE PHASE MOTOR IN WHICH STRUCTURE FOR PREVENTING ELECTRICAL SHORT CIRCUIT IS APPLIED

BACKGROUND

1. Field of the Invention

The present invention relates to a motor, and more particularly, to a motor applied to an electric power steering (EPS) system.

2. Discussion of Related Art

Generally, a hydraulic steering device using hydraulic pressure of a hydraulic pump and an electric steering device using a motor are applied as steering devices in vehicles.

The hydraulic steering device consumes energy at all times regardless of a rotation of a steering wheel since the hydraulic pump, which is a power source supplying auxiliary steering power, is operated by an engine, whereas in the electric steering device, if a steering torque is generated by rotation of a steering wheel, auxiliary steering power proportionate to a steering torque is supplied to the motor.

The electric steering device is configured to have the auxiliary steering power transferred to a rack bar if the steering torque generated by the rotation of the steering wheel is transferred to the rack bar via a rack-pinion mechanism portion and the auxiliary steering power is generated in a steering motor based on the generated steering torque. That is, the steering torque generated by the steering wheel and the auxiliary steering power generated in the steering motor are combined to enable the rack bar to be moved in the axial direction.

A three phase motor is employed in the case of the steering motor, and the three phase motor generally includes a rotor having a magnetic body and a stator including three types of coils (U/V/W phase wires) receiving different phases of power having a phase difference of 120°.

Meanwhile, if an electrical short circuit occurs among the coils to which different phases of power are applied, the motor may malfunction or be damaged, causing a great risk of accidents due to generation of erroneous auxiliary steering power while driving.

SUMMARY OF THE INVENTION

According to an embodiment of the present invention, an object of a three phase motor in which a structure for preventing an electrical short circuit is applied is as follows.

An electrical short circuit among coils receiving different phases of power is prevented in a three phase motor to prevent malfunction of and damage to the motor, thereby providing a three phase motor capable of reducing a risk of accidents while driving.

The objects of the present invention are not limited to that mentioned above, and other unmentioned objects will be clearly understood by those of ordinary skill in the art by descriptions below.

According to an embodiment of the present invention, there is provided a three phase motor in which a structure for preventing an electrical short circuit is applied, the three phase motor including: a stator that includes a base portion having a hollow formed therein and a plurality of winding portions extending from the base portion toward the hollow and formed apart a predetermined distance from each other; a rotor having a plurality of magnets inserted therein and disposed in the hollow apart from ends of the winding portions; and an insulation sheet disposed between the winding portions abutting each other to prevent an electrical short circuit among the coils wound around the winding portions abutting each other.

Preferably, insulators are formed at the side surfaces of the winding portions and inner surfaces of the base portion connected to the side surfaces of the winding portions abutting each other.

Preferably, an accommodation groove accommodating one side of the insulation sheet is formed at a portion of the insulators formed at the inner surfaces of the base portion.

Preferably, a protruding portion for preventing the insulation sheet from moving toward the rotor is formed on at least one end of the insulators formed on the side surfaces of the winding portions abutting each other.

Preferably, a first protruding portion formed to extend toward another end is formed on one end of the insulators formed on the side surfaces of the winding portions abutting each other, a second protruding portion formed to extend toward the one end is formed on the other end of the insulators formed on the side surfaces of the winding portions abutting each other, and the first protruding portion and the second protruding portion cross each other to overlap without coming in contact with each other.

Preferably, the stator is divided into an upper portion and a lower portion in the longitudinal direction, the first protruding portion is formed at the outer portion of the second protruding portion at a region of the insulators corresponding to the upper portion, and the first protruding portion is formed at the inner portion of the second protruding portion at a region of the insulators corresponding to the lower portion.

According to an embodiment of the present invention, the three phase motor in which a structure for preventing an electrical short circuit is applied includes the insulation sheet disposed among the coils receiving different phases of power, thereby ensuring electrical insulation among the coils.

Furthermore, protrusions are formed at the insulators formed on the inner surfaces of the base portion connecting the winding portions, thereby preventing the insulation sheet from being introduced into a gap formed between the rotor and the stator due to high speed rotation of the three phase motor.

The advantages of the present invention are not limited to those mentioned above, and other unmentioned advantages will be clearly understood by those of ordinary skill in the art by descriptions below.

DETAILED DESCRIPTION OF EXEMPLARY EMBODIMENTS

Figure 1:
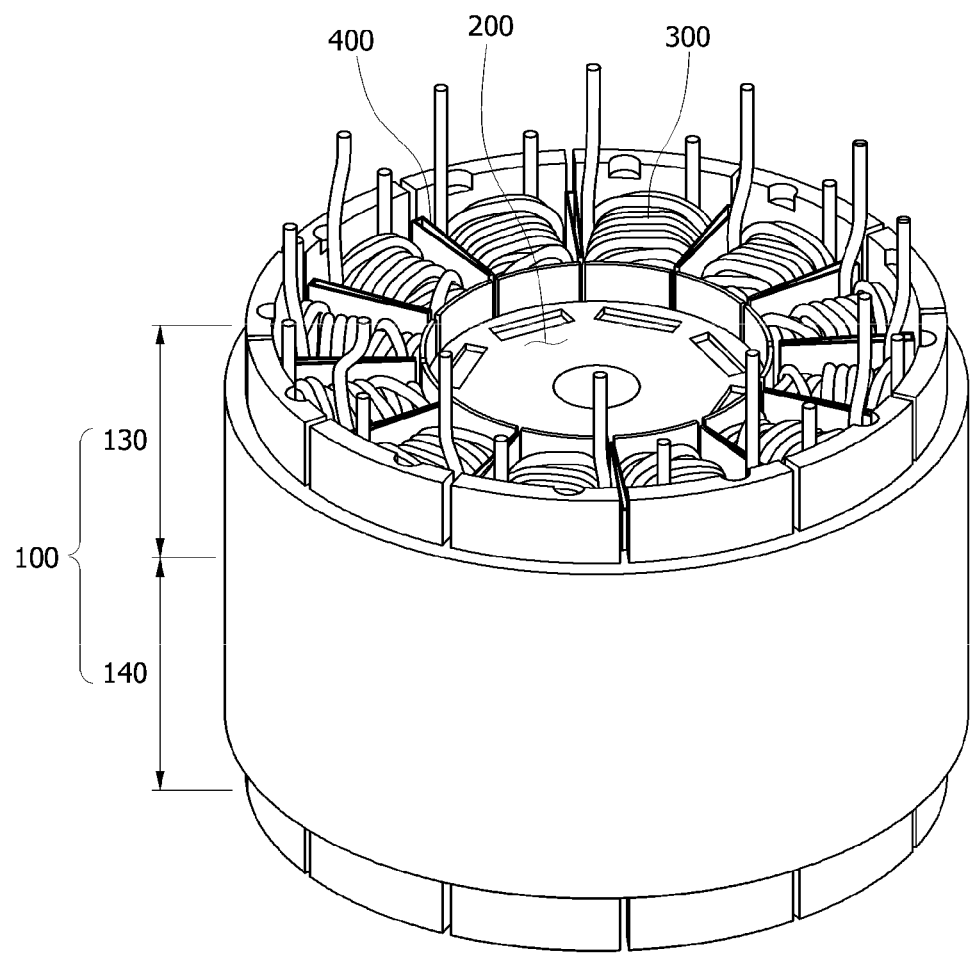
FIG. 1 is a perspective view of a three phase motor in which a structure for preventing an electrical short circuit is applied according to the present invention.

Exemplary embodiments of the present invention will be described in detail below with reference to the accompanying drawings while like reference numerals will be given to like or similar elements regardless of symbols in the drawings and repeated explanation thereof will be omitted.

In addition, if a detailed description of the known art related to the present invention is deemed to make the gist of the present invention vague, the detailed description will be omitted. In addition, the accompanying drawings are only intended to make the spirit of the present invention easier to understand, and the spirit of the present invention should not be construed as being limited by the accompanying drawings.

Figure 2:
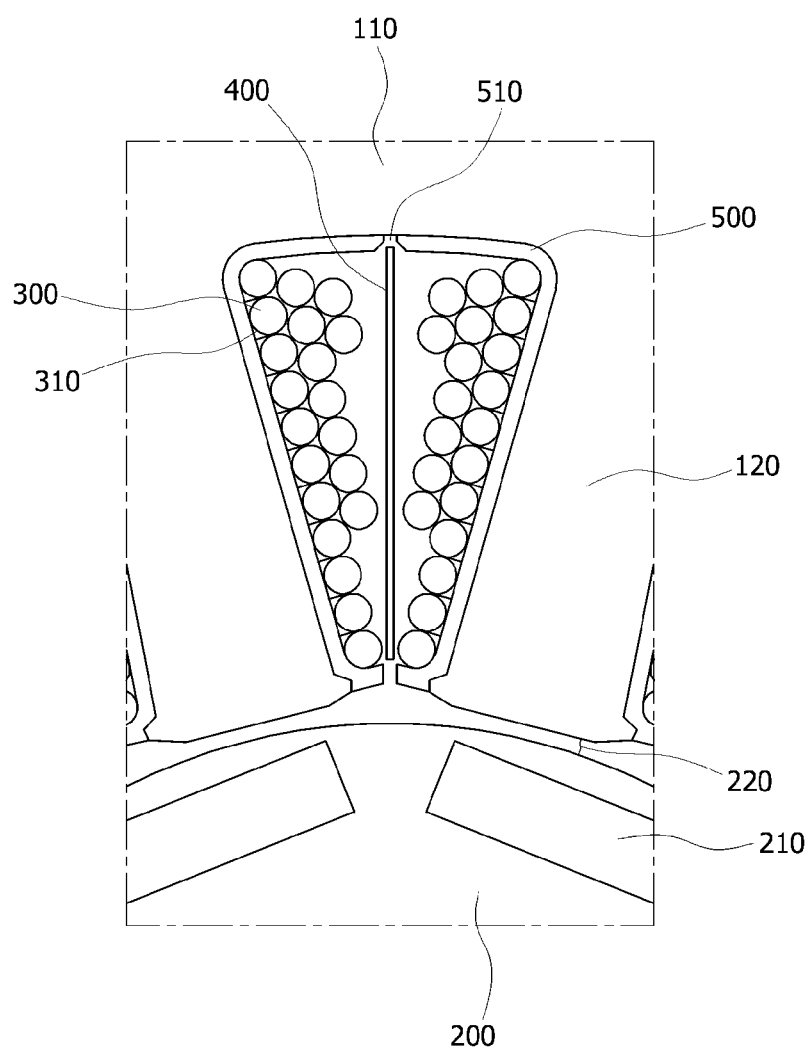
FIG. 2 and FIG. 3 are cross-sectional views of the three phase motor in which a structure for preventing an electrical short circuit is applied according to an embodiment of the present invention.
Figure 3:
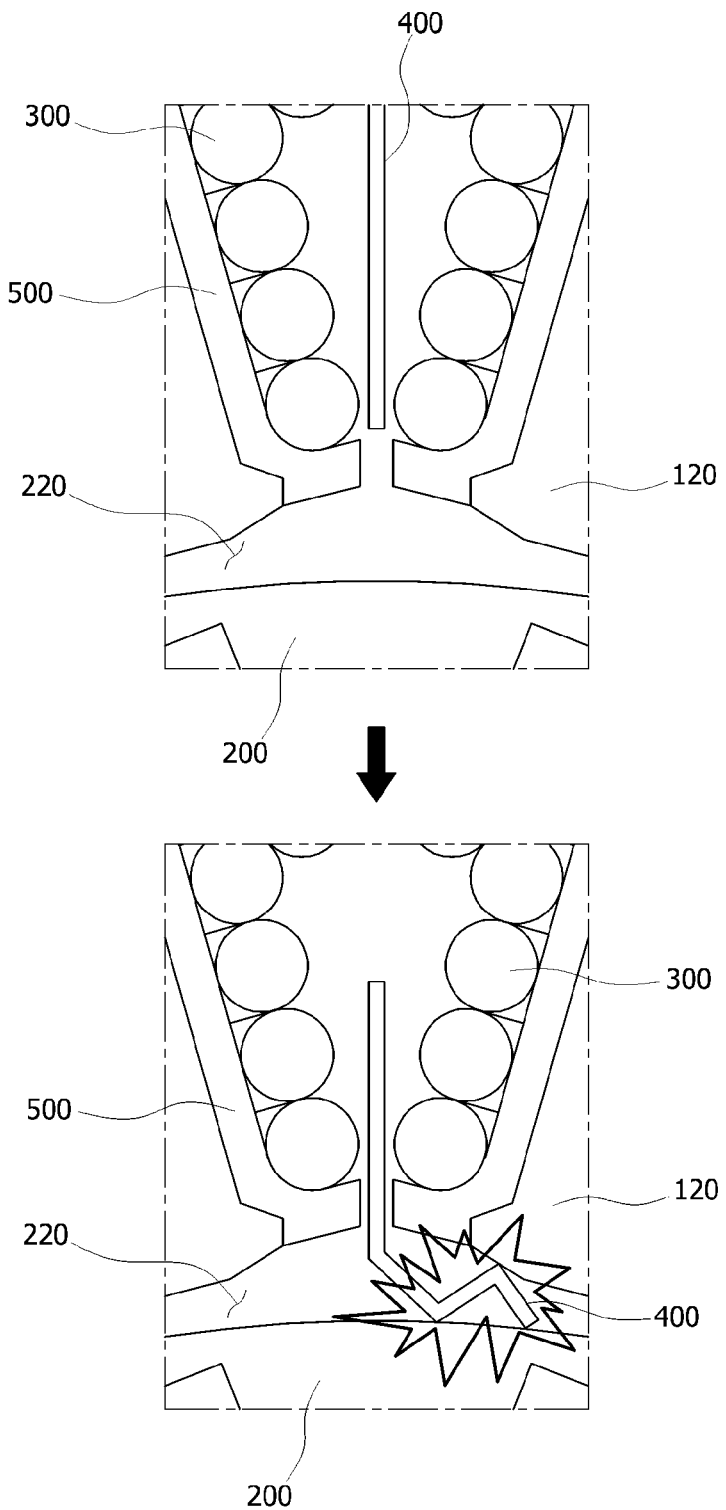
Figure 4:
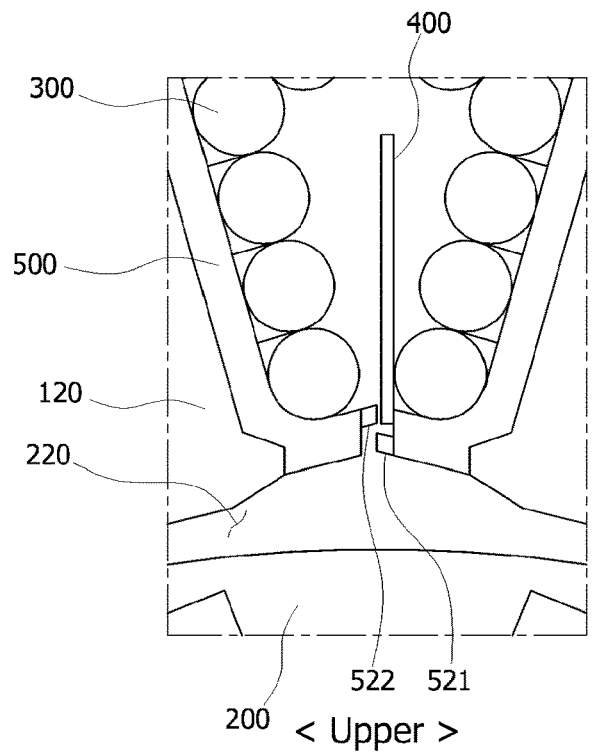
FIG. 4 and FIG. 5 are cross-sectional views of the three phase motor in which a structure for preventing an electrical short circuit is applied according to another embodiment of the present invention.
Figure 4:
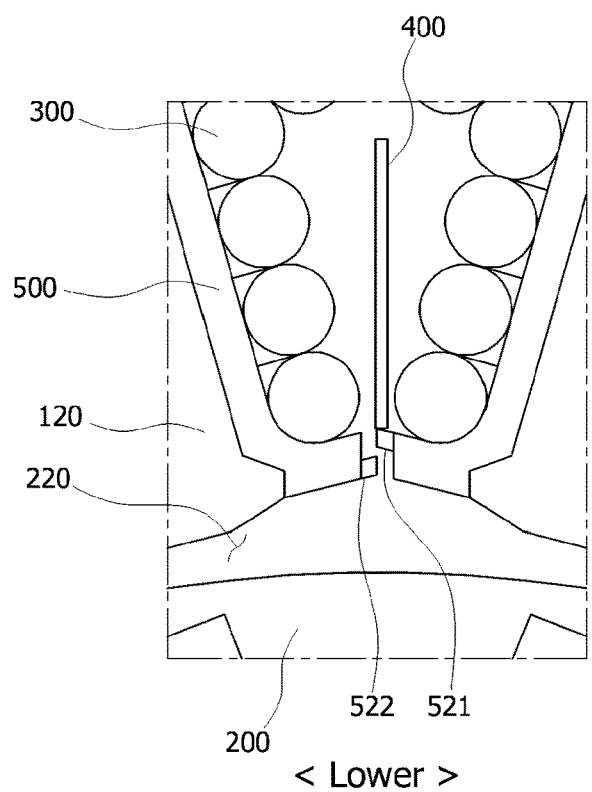
Figure 5:
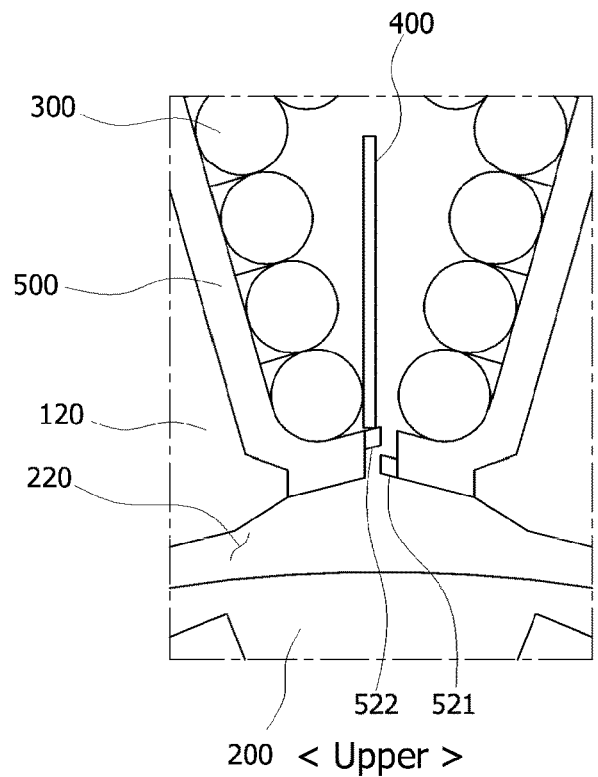
Figure 5:
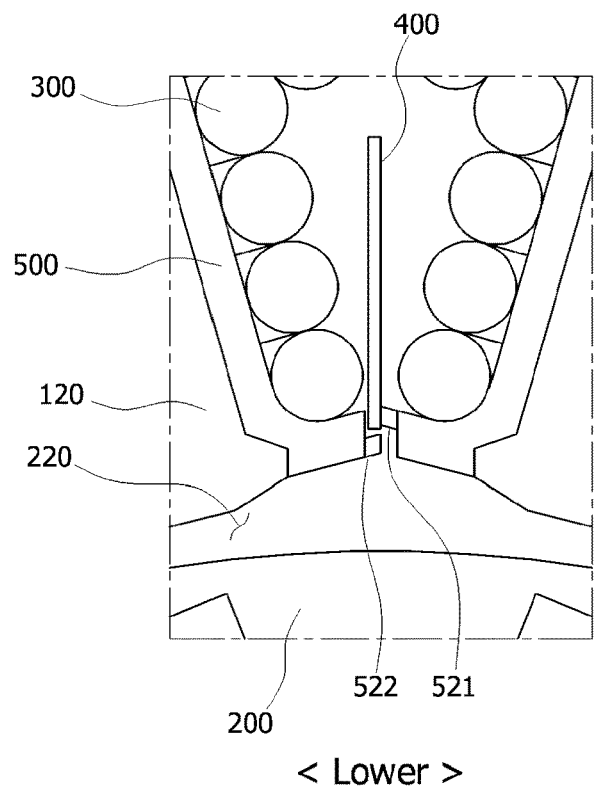

Hereinafter, a structure of a motor in which a structure for preventing an electrical short circuit is applied according to the present invention and various embodiments thereof will be described with reference to FIGS. 1 to 5. FIG. 1 is a perspective view of a motor in which a structure for preventing an electrical short circuit is applied according to the present invention, and FIG. 2 and FIG. 3 are cross-sectional views of a motor in which a structure for preventing an electrical short circuit is applied according to an embodiment of the present invention. FIG. 4 and FIG. 5 are cross-sectional views of a motor in which a structure for preventing an electrical short circuit is applied according to another embodiment of the present invention.

As depicted in FIG. 1, the three phase motor in which a structure for preventing an electrical short circuit is applied according to the present invention is mainly formed of a stator 100 and a rotor 200.

The stator 100 includes a base portion 110 having a hollow formed therein and a plurality of winding portions 120 extended from the base portion 110 toward the hollow and formed apart a predetermined distance from each other. Coils 300 are wound around the winding portions 120, and more specifically, the winding portions 120 include the coils 300 receiving three different phases of power. The three different phases of power are U/V/W phases having a phase difference of 120°. Accordingly, the number of wound coils should be a multiple of three.

The rotor 200 is rotated during operation of the motor, and is disposed at the inner hollow of the stator 100 apart from the ends of the winding portions 120. A plurality of magnets 210 are inserted inside the rotor 200, wherein magnets with north poles and south poles are alternately inserted and disposed as depicted in FIG. 1.

Consequently, if different phases of power having a phase difference of 120° are applied to the coils 300 disposed at the stator 100, the rotor 200 is rotated inside the stator 100 by a magnetic field generated by the magnets inserted inside the rotor 200.

Meanwhile, if an electrical short circuit occurs among the coils 300 to which different phases of power are applied, the motor may malfunction or be damaged, causing danger while driving. Thus, insulation for preventing an electrical short circuit among the coils 300 is extremely important.

To prevent an electrical short circuit among the coils, an insulator film 310 has to be primarily formed outside coils 300, as depicted in FIG. 2. In addition, to prevent an electrical short circuit among the coils 300 and the stator 100, insulators 500 have to be formed at the side surfaces of each of the winding portions 120 and the inner surfaces of the base portion 110 connected to the side surfaces of the winding portions 120 abutting each other. Furthermore, to prevent an electrical short circuit among the coils 300 to which different phases of power are applied, it is preferable that an insulation sheet 400 be disposed between the winding portions 120 abutting each other.

The insulation sheet 400 may be moved within a space formed between the winding portions 120 abutting each other. Thus, it is preferable that an accommodation groove 510 capable of accommodating one side of the insulation sheet 400 be formed at a portion of the insulators 500 formed at the inner surfaces of the base portion 110 to minimize the movement of the insulation sheet 400, as depicted in FIG. 2.

However, in the case of a motor in which a structure for preventing an electrical short circuit is applied according to an embodiment of the present invention depicted in FIG. 2 and FIG. 3, a portion of the insulators 500 facing the inner surfaces of the base portion 110 is opened in a manufacturing process. Specifically, the motor depicted in FIG. 2 and FIG. 3 is formed of a 12-slot/8-pole structure which includes a total of twelve coils 300 and eight magnets 210. In this case, in order to facilitate the winding of the coils 300, the stator 100 is divided into one segment in each slot and one stator 100 is formed by assembling each of the segments after winding the coils 300. In this process, the portion of the insulators 500 facing the inner surfaces of the base portion 110 cannot be closed since the insulators 500 are formed for each of the segments.

In this case, as depicted in FIG. 3, the insulation sheet 400 may be introduced into a gap 220 formed between the stator 100 and the rotor 200 through the opened portion during the operation of the motor, thereby causing an abnormality during the rotation of the motor and leading to a severe safety problem.

According to another embodiment of the present invention, a three phase motor in which a structure for preventing an electrical short circuit is applied preferably includes a protruding portion formed on at least one end of the insulators 500 formed at the side surfaces of the winding portions 120 abutting each other to prevent the insulation sheet 400 from being introduced into the gap 220 between the stator 100 and the rotor 200

Furthermore, a first protruding portion 521 formed to extend toward another end is formed at one end of the insulators 500 formed on the side surfaces of the winding portions 120 abutting each other, and a second protruding portion 522 formed to extend toward the one end is formed at the other end, wherein the first protruding portion 521 and the second protruding portion 522 may cross each other to overlap without coming in contact with each other.

However, if the first protruding portion 521 and the second protruding portion 522 are uniformly formed in the longitudinal direction of the insulators 500, the insulation sheet 400 may still be introduced into the gap 220 formed between the stator 100 and the rotor 200. Consequently, to solve this problem, the three phase motor in which a structure for preventing an electrical short circuit is applied according to another embodiment of the present invention may have the protruding portions formed differently in the longitudinal direction of the insulators 500, as depicted in FIG. 5 and FIG. 6.

Specifically, after dividing the stator 100 into an upper portion 130 and a lower portion 140 in the longitudinal direction, it is preferable that the first protruding portion 521 be formed to surround the outer portion of the second protruding portion 522 at a region of the insulators 500 corresponding to the upper portion 130, and the second protruding portion 522 be formed to surround the outer portion of the first protruding portion 521 at a region of the insulators 500 corresponding to the lower portion 140.

In this case, as depicted in FIG. 4, if the insulation sheet 400 is tilted toward the right side of the inner spaces of the winding portions 120 abutting each other, the insulation sheet 400 may be introduced into the gap 220 through a portion next to the end of the second protruding portion 522 at the upper portion 130 of the stator 100. However, the first protruding portion 521 blocks the introduction path of the insulation sheet 400 toward the gap 220 at the lower portion 140 of the stator 100, thereby preventing the insulation sheet 400 from being introduced into the gap 220 between the stator 100 and the rotor 200.

On the other hand, as depicted in FIG. 5, if the insulation sheet 400 is tilted toward the left side of the inner spaces of the winding portions 120 abutting each other, the insulation sheet 400 may be introduced into the gap 220 through a portion next to the end of the first protruding portion 521 at the lower portion 140 of the stator 100. However, the second protruding portion 522 blocks the introduction path of the insulation sheet 400 toward the gap 220 at the upper portion 130 of the stator 100.

Consequently, the motor in which a structure for preventing an electrical short circuit is applied according to another embodiment of the present invention not only ensures that an electrical short circuit does not occur among the coils receiving different phases of power by disposing the insulation sheet 400, but also ensures that the insulation sheet 400 is not introduced into the gap 220 formed between the stator 100 and the rotor 200, thereby preventing accidents caused by abnormal operation of the motor.

Meanwhile, the first protruding portion 521 and the second protruding portion 522 may be formed throughout the region of the insulators 500 corresponding to the upper portion 130 or the lower portion 140, or may be formed only in a partial region thereof.

The embodiments described in this specification and the attached drawings merely serve to illustratively describe a part of the technical spirit included in the present invention. Accordingly, the embodiments disclosed in this specification are not for limiting the technical spirit of the present invention but for describing the same, and thus it is evident that the scope of the technical spirit of the present invention is not limited by the embodiments. Modifications and specific embodiments that can be easily made by those of ordinary skill in the art within the scope of the technical spirit included in the specification and the drawings of the present invention should all be construed as belonging to the scope of the present invention.

What is claimed is:

1. A three phase motor in which a structure for preventing an electrical short circuit is applied, the three phase motor comprising:
    a stator comprising a base portion having a hollow formed therein and a plurality of winding portions extended from the base portion toward the hollow and formed apart a predetermined distance from each other;
    a rotor having a plurality of magnets inserted therein and disposed in the hollow apart from ends of the winding portions; and
    an insulation sheet disposed between the winding portions abutting each other to prevent an electrical short circuit among coils wound around the winding portions abutting each other,
    wherein the insulators are formed at side surfaces of the winding portions and inner surfaces of the base portion connected to the side surfaces of the winding portions abutting each other, and
    wherein a first protruding portion formed to extend toward another end is formed at one end of the insulators formed at the side surfaces of the winding portions abutting each other, a second protruding portion formed to extend toward the one end is formed at the other end of the insulators formed at the side surfaces of the winding portions abutting each other, and the first protruding portion and the second protruding portion cross each other to overlap without coming in contact with each other.

2. The three phase motor of claim 1, wherein an accommodation groove accommodating one side of the insulation sheet is formed at a portion of the insulators formed at the inner surfaces of the base portion.

3. The three phase motor of claim 1, wherein a protruding portion for preventing the insulation sheet from being moved toward the rotor is formed on at least one end of the insulators formed at the side surfaces of the winding portions abutting each other.

4. The three phase motor of claim 1, wherein the stator is divided into an upper portion and a lower portion in the longitudinal direction, the first protruding portion is formed at the outer portion of the second protruding portion at a region of the insulators corresponding to the upper portion, and the first protruding portion is formed at the inner portion of the second protruding portion at a region of the insulators corresponding to the lower portion.

* * * * *